US009828047B2

(12) United States Patent
Eavenson, Sr. et al.

(10) Patent No.: US 9,828,047 B2
(45) Date of Patent: Nov. 28, 2017

(54) SUSPENSION AND LOCK-OUT SYSTEMS FOR A TRACKED VEHICLE

(71) Applicant: MTD PRODUCTS INC, Valley City, OH (US)

(72) Inventors: Jimmy N. Eavenson, Sr., Valley City, OH (US); Tim Dilgard, Valley City, OH (US); Ryan Cmich, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 14/412,285

(22) PCT Filed: Jul. 3, 2013

(86) PCT No.: PCT/US2013/049278
§ 371 (c)(1),
(2) Date: Dec. 31, 2014

(87) PCT Pub. No.: WO2014/008370
PCT Pub. Date: Jan. 9, 2014

(65) Prior Publication Data
US 2015/0166133 A1 Jun. 18, 2015

Related U.S. Application Data

(60) Provisional application No. 61/668,650, filed on Jul. 6, 2012, provisional application No. 61/668,671, filed on Jul. 6, 2012.

(51) Int. Cl.
*B62D 55/12* (2006.01)
*B62D 55/108* (2006.01)
(Continued)

(52) U.S. Cl.
CPC ............. *B62D 55/12* (2013.01); *B62D 55/10* (2013.01); *B62D 55/108* (2013.01);
(Continued)

(58) Field of Classification Search
CPC ...... B62D 55/07; B62D 55/04; B62D 55/244; B62D 55/108; B62D 55/12
See application file for complete search history.

(56) References Cited

U.S. PATENT DOCUMENTS 2,719,062 A 9/1955 Arps
3,435,908 A 4/1969 Oldenburg
(Continued)

FOREIGN PATENT DOCUMENTS

DE 1200144 9/1965
EP 0578504 1/1994
(Continued)

OTHER PUBLICATIONS

US 9,008,928, 04/2015, Oishi et al. (withdrawn)
(Continued)

*Primary Examiner* — Hau Phan
(74) *Attorney, Agent, or Firm* — Wegman, Hessler & Vanderburg

(57) ABSTRACT

A suspension for a tracked utility vehicle is provided. The trailing link suspension for the tracked utility vehicle has at least two trailing links. Each of said trailing links has a shock and a walking beam. The first end of the trailing link is pivotably connected to the tracked utility vehicle chassis. The second end of said trailing link is pivotably connected to the walking beam. The first end of the shock is pivotably connected to the chassis and the second end is pivotably connected to the trailing link. The walking beam has a plurality of axle mounted bogey wheels for engaging one or both of the track of said tracked utility vehicle or the track
(Continued)

lug or guide. The shocks are independently adjustable to permit more of the tracked utility vehicle's weight to be supported at the suspension midpoint.

21 Claims, 14 Drawing Sheets

(51) Int. Cl.
  *B62D 55/112* (2006.01)
  *B62D 55/10* (2006.01)
  *B62D 55/14* (2006.01)

(52) U.S. Cl.
  CPC ........ *B62D 55/1083* (2013.01); *B62D 55/112* (2013.01); *B62D 55/1125* (2013.01); *B62D 55/14* (2013.01)

(56) References Cited

U.S. PATENT DOCUMENTS

| | | | |
|---|---|---|---|
| 3,664,449 A | 5/1972 | Vardell | |
| 3,666,034 A | 5/1972 | Baker | |
| 3,756,335 A | 9/1973 | Eisele | |
| 3,789,942 A | 2/1974 | Kowalik | |
| 3,826,388 A | 7/1974 | Oldenburg | |
| 3,860,079 A * | 1/1975 | Hoffman | B62M 27/02 180/193 |
| 3,888,132 A | 6/1975 | Russ, Sr. | |
| 3,933,213 A * | 1/1976 | Trowbridge | B62D 55/07 180/193 |
| 3,938,605 A | 2/1976 | Koch | |
| 3,938,606 A | 2/1976 | Yancey | |
| 3,948,331 A | 4/1976 | Esch | |
| 4,003,608 A | 1/1977 | Carter | |
| 4,043,417 A * | 8/1977 | Orpana | B62D 55/108 180/9.54 |
| 4,166,511 A | 9/1979 | Stedman | |
| 4,202,564 A | 5/1980 | Strader | |
| 4,221,272 A | 9/1980 | Kell | |
| 4,304,313 A | 12/1981 | van der Lely | |
| 4,378,133 A | 3/1983 | Trautwein | |
| 4,458,955 A | 7/1984 | Webb | |
| 4,462,480 A | 7/1984 | Yasui | |
| 4,501,452 A | 2/1985 | Huang | |
| 4,566,553 A | 1/1986 | McCutcheon | |
| 4,618,015 A | 10/1986 | Yochum | |
| 4,683,970 A | 8/1987 | Smith | |
| 4,706,769 A | 11/1987 | Latourelle et al. | |
| 4,953,919 A | 9/1990 | Langford | |
| 4,987,965 A | 1/1991 | Bourret | |
| 5,258,912 A | 11/1993 | Ghoneim | |
| 5,273,126 A | 12/1993 | Reed et al. | |
| 5,316,381 A | 5/1994 | Isaacson | |
| 5,318,141 A | 6/1994 | Hansen | |
| 5,323,866 A | 6/1994 | Simard | |
| 5,372,212 A | 12/1994 | Davis | |
| 5,393,134 A | 2/1995 | Oertley | |
| 5,409,305 A | 4/1995 | Nagorcka | |
| 5,575,347 A * | 11/1996 | Uchibaba | B60G 5/04 180/9.1 |
| 5,622,234 A | 4/1997 | Nagorcka et al. | |
| 5,791,429 A | 8/1998 | Bergman | |
| 5,899,541 A | 5/1999 | Ying | |
| 5,899,543 A | 5/1999 | Lykken et al. | |
| RE36,284 E | 8/1999 | Kelderman | |
| 5,938,301 A | 8/1999 | Hostetler et al. | |
| 5,975,226 A | 11/1999 | Matsumoto et al. | |
| 5,988,775 A * | 11/1999 | Nordberg | B62D 55/305 305/130 |
| 6,000,766 A | 12/1999 | Takeuchi et al. | |
| 6,006,847 A | 12/1999 | Knight | |
| 6,074,025 A | 6/2000 | Juncker | |
| 6,123,399 A | 9/2000 | Snyder | |
| 6,135,220 A | 10/2000 | Gleasman | |
| 6,164,399 A | 12/2000 | Bays | |
| 6,199,646 B1 | 3/2001 | Tani | |
| 6,241,327 B1 | 6/2001 | Gleasman et al. | |
| 6,253,867 B1 * | 7/2001 | Lillbacka | B60G 15/12 180/193 |
| 6,260,465 B1 | 7/2001 | Zonak et al. | |
| 6,289,995 B1 * | 9/2001 | Fuller | A62C 27/00 169/24 |
| 6,450,280 B1 | 9/2002 | Pepka | |
| 6,485,115 B1 | 11/2002 | Egle | |
| 6,547,345 B2 | 4/2003 | Phely | |
| 6,595,603 B2 | 7/2003 | Rutz et al. | |
| 6,615,939 B1 | 9/2003 | Karales et al. | |
| 6,655,482 B2 | 12/2003 | Simmons | |
| 6,733,093 B2 | 5/2004 | Deland et al. | |
| 6,807,466 B2 | 10/2004 | Strothmann | |
| 6,810,975 B2 | 11/2004 | Nagorcka et al. | |
| 6,840,338 B2 | 1/2005 | Bowers et al. | |
| 6,860,571 B2 | 3/2005 | Scheetz | |
| 6,892,838 B2 | 5/2005 | Bowers | |
| 6,904,986 B2 | 6/2005 | Brazier | |
| 6,904,993 B1 | 6/2005 | Rinck | |
| 6,926,108 B1 | 8/2005 | Polakowski | |
| 6,962,219 B2 | 11/2005 | Hauser | |
| 7,017,688 B2 | 3/2006 | Bowers et al. | |
| 7,131,508 B2 | 11/2006 | Brazier | |
| 7,267,414 B2 | 9/2007 | Scheetz | |
| 7,308,958 B2 | 12/2007 | Tamor | |
| 7,328,760 B2 | 2/2008 | Inaoka et al. | |
| 7,367,637 B2 | 5/2008 | Gleasman | |
| 7,416,266 B2 | 8/2008 | Soucy et al. | |
| 7,464,785 B2 | 12/2008 | Spark | |
| 7,478,688 B2 | 1/2009 | Ki | |
| 7,520,348 B2 | 4/2009 | Bergsten et al. | |
| 7,552,785 B2 | 6/2009 | Tuhy | |
| 7,562,727 B1 | 7/2009 | Hoffart | |
| 7,575,289 B2 | 8/2009 | Sugihara | |
| 7,597,161 B2 | 10/2009 | Brazier | |
| 7,641,006 B2 | 1/2010 | Scheetz | |
| 7,644,788 B2 | 1/2010 | Scheetz | |
| 7,673,711 B1 | 3/2010 | Berg | |
| 7,677,344 B2 | 3/2010 | Medina | |
| 7,708,092 B2 | 5/2010 | Després | |
| 7,784,884 B2 * | 8/2010 | Soucy | B62D 55/244 305/171 |
| 8,002,365 B2 | 8/2011 | Jacobsen et al. | |
| 8,011,458 B2 | 9/2011 | Hauser | |
| 8,083,242 B2 | 12/2011 | Brazier | |
| 8,104,846 B2 | 1/2012 | Porubcansky et al. | |
| 8,152,248 B2 | 4/2012 | Brazier | |
| 8,430,188 B2 | 4/2013 | Hansen | |
| 8,573,348 B2 | 11/2013 | Cantemir | |
| 8,579,065 B2 | 11/2013 | Bergsten | |
| 8,630,770 B2 | 1/2014 | Matsumoto | |
| 8,701,801 B2 | 4/2014 | Itou | |
| 8,746,815 B2 | 6/2014 | Reshad | |
| 8,783,390 B2 | 7/2014 | Maeda | |
| 8,855,861 B2 | 10/2014 | Goebel | |
| 9,008,915 B2 | 4/2015 | Kang et al. | |
| 9,566,858 B2 | 2/2017 | Hicke | |
| 2002/0153188 A1 | 10/2002 | Brandt | |
| 2003/0180370 A1 * | 9/2003 | Lesniak | A61K 41/0052 424/490 |
| 2004/0099451 A1 | 5/2004 | Nagorcka | |
| 2004/0244349 A1 | 12/2004 | Meier | |
| 2005/0035655 A1 | 2/2005 | Beckstrom | |
| 2005/0077984 A1 * | 4/2005 | Lee | H01P 1/2039 333/204 |
| 2005/0248214 A1 | 11/2005 | Sugihara et al. | |
| 2009/0278403 A1 | 11/2009 | Canossa | |
| 2009/0308669 A1 | 12/2009 | Vos | |
| 2010/0060075 A1 * | 3/2010 | Hansen | B62D 55/04 305/15 |
| 2010/0139994 A1 | 6/2010 | Hansen | |
| 2010/0307843 A1 | 12/2010 | Lawson | |
| 2012/0161511 A1 | 6/2012 | Brazier | |
| 2012/0242142 A1 | 9/2012 | Kautsch | |
| 2013/0192905 A1 | 8/2013 | Janzen | |
| 2014/0175865 A1 | 6/2014 | Korus | |

(56) References Cited

U.S. PATENT DOCUMENTS

| | | |
|---|---|---|
| 2014/0288763 A1 | 9/2014 | Bennett |
| 2014/0305715 A1 | 10/2014 | Makino |
| 2015/0134202 A1 | 5/2015 | Dawson |

FOREIGN PATENT DOCUMENTS

| | | |
|---|---|---|
| JP | 07205852 | 8/1995 |
| JP | 10-129544 | 5/1998 |
| JP | 3937643 | 6/2007 |
| KR | 1020010078749 | 8/2001 |
| WO | 93/11022 A1 | 6/1993 |
| WO | 03059720 | 7/2003 |
| WO | 2005101945 | 11/2005 |
| WO | 2010046905 | 4/2010 |
| WO | 2014008378 | 1/2014 |

OTHER PUBLICATIONS

International Search Report and Written Opinion mailed Dec. 7, 2016 for related PCT/US2016/035025.
Office Action Dated Nov. 29, 2016 for related U.S. Appl. No. 14/484,899.
Office Action Dated Apr. 14, 2016 for related U.S. Appl. No. 14/724,172.
Office Action Dated May 27, 2016 for related U.S. Appl. No. 14/484,993.
Office Action Dated Jan. 29, 2016 for related U.S. Appl. No. 14/412,133.
International Search Report and Written Opinion dated Oct. 7, 2013 for corresponding patent application No. PCT/US2013/049289.
International Search Report and Written Opinion dated Oct. 11, 2013 for corresponding patent application No. PCT/US2013/049278.
International Search Report and Written Opinion mailed Nov. 5, 2015 for PCT/US2015/046266 filed Aug. 21, 2015.
International Search Report and Written Opinion for corresponding International Application No. PCT/US2014/055424 dated Dec. 5, 2014.
Notice of Allowance dated Jan. 4, 2017 for related U.S. Appl. No. 14/484,993.
Office Action of Related Chinese Patent Application No. 201480050347.5, dated Apr. 1, 2017, pp. 1-11.
Notice of Allowance dated Sep. 21, 2017 for related U.S. Appl. No. 14/484,899 (pp. 1-7).
Office Action dated Sep. 27, 2017 for related U.S. Appl No. 15/168,945 (pp. 1-9).

* cited by examiner

SUSPENSION AND LOCK-OUT SYSTEMS FOR A TRACKED VEHICLE

CROSS-REFERENCE TO RELATED APPLICATIONS

This application claims the priority under 35 U.S.C. 119 to U.S. Provisional Patent Application Ser. No. 61/668,650 filed Jul. 6, 2012, and entitled "DRIVE SPROCKET FOR A TRACKED UTILITY VEHICLE", and to U.S. Provisional Patent Application Ser. No. 61/668,671 filed Jul. 6, 2012, and entitled "SUSPENSION AND LOCK-OUT SYSTEMS FOR A TRACKED VEHICLE", both of which are herein incorporated by reference in their entireties.

FIELD OF THE INVENTION

The present invention is directed to a garden or lawn utility vehicle, and more particularly, to a suspension system for a garden or lawn utility vehicle having a tracked propulsion system.

BACKGROUND OF THE INVENTION

A tracked vehicle's weight is transferred to the bottom length of track by a number of road wheels, or sets of bogie wheels. Road wheels are frequently mounted on some form of suspension to cushion the ride over rough ground. Suspension design in military vehicles is a major area of development, and the very early designs were often completely un-sprung. Later-developed road wheel suspension offered only a few inches of travel using springs, whereas modern hydro-pneumatic systems can provide several feet of travel and typically incorporate shock absorbers. Torsion-bar suspension is probably the most common type of military vehicle suspension. Construction vehicles have smaller road wheels that are designed primarily to prevent track derailment, and they are normally contained within a single bogie that integrates the idler wheel and sometimes the drive sprocket.

Track drive suspensions are inherently faced with performance issues which include limited travel/effective suspension, track derailment, and restricted/limited utilization of attachments. These limitations have a direct effect on machine directional/steering control, ride quality, flexibility/functionality with attachments, stability and travel speed.

Transfer of power to the tracks is accomplished by drive wheels (friction), or drive sprockets, that are powered by transmissions or motors that engage holes or lugs in the track links that drive the track. In military vehicles, the drive wheel is typically mounted well above the contact area on the ground, allowing it to be fixed in position. In agricultural and construction tracked vehicles, the drive wheel is normally incorporated as part of the bogie. Placing suspension on the drive sprocket is possible, but is mechanically more complicated. A non-powered wheel, an idler, is placed at the opposite end of the track, primarily to tension the track-loose track could be easily thrown (slipped) off the wheels. To prevent throwing, the inner surfaces of the tracks usually have vertical guide lugs engaging gaps between the bogie and idler/sprocket wheels. In military vehicles with a rear sprocket, the idler wheel is placed higher than the road wheels to allow it to climb over obstacles. Some track arrangements use return rollers to keep the top of the track running straight between the drive sprocket and idler. Others, called slack track, allow the track to droop and run along the tops of large bogie (sometimes called road) wheels. This was a feature of the Christie suspension, leading to occasional misidentification of other slack track-equipped vehicles. Many WW II German military vehicles, including all half-track and all later tank designs (after the Panzer IV), had slack-track systems, usually driven by front-located drive sprockets, running along the tops of the often overlapping, and sometimes interleaved, large diameter doubled road wheels (on the Tiger I and Panther, in their suspension systems). The choice of overlapping/interleaved road wheels allowed the use of slightly more torsion bar suspension members, allowing any German tracked military vehicle with such a setup to have a noticeably smoother ride over challenging terrain, but at the expense of mud and ice collecting between the overlapping areas of the road wheels, and freezing solid in cold weather conditions, often immobilizing the vehicle so equipped.

It takes considerable power to steer a tracked vehicle. As the vehicle turns, the leading and trailing ends of the footprint, or contact patch, skid sideways, perpendicular to the direction the tracks roll. Hence the name "skid steering" could be applied.

In FIG. 1, the arrows indicate the direction in which the contact patch will move during a right (clockwise) neutral axis (Zero) turn. A neutral axis (Zero) turn is a turn about a center point through the machine or the powered drive axle. The further toward the ends, the more the track will move in a direction other than the direction in which it would normally move for forward propulsion.

FIG. 2 shows the magnitude of the frictional forces that must be overcome in order to make the vehicle turn about its vertical axis. These are simply the horizontal component of the direction that each point of the contact patch will move as the vehicle rotates. The friction at any point is proportional to the distance forward of the vertical axis. From this it follows that the total force required is proportional to the length of the contact patch, the weight of the vehicle, and the inverse of the radius of the turn.

The worst-case scenario for overcoming friction is the pivot turn. A pivot turn is a turn about a center point through the center of a "stationary" traction track. In a pivot turn, in which one track travels in a direction while the other track stays stationary, which results in the vehicle rotating about a center point through the center of a "stationary" traction track.

Further, turns executed while both tracks are traveling generally require less power, as less energy is required to overcome the static friction associated with a travelling track, as opposed to a static track. Also, apart from the pivot turn, when compared to the zero turn, turns of greater radii will require less power, as the energy required to overcome the static friction (or terrain abrasion) is spread out over a longer period of time.

Therefore, a need exists for an improved suspension system for tracked vehicles.

BRIEF SUMMARY OF THE INVENTION

In one aspect of the invention, a trailing link suspension for a tracked utility vehicle having a chassis comprises: a forward trailing link having a first end pivotably connected to the chassis and a second end pivotably connected to a forward walking beam at a walking beam pivot; a forward shock having a first end pivotably connected to the chassis and a second end pivotably connected to the forward trailing link; a rear trailing link having a first end pivotably connected to the chassis and a second end pivotably connected to a rear walking beam at a walking beam pivot; a rear shock having a first end pivotably connected to the chassis and a second end pivotably connected to the rear trailing link; an intermediate trailing link located between the forward tailing link and the rear trailing link; the intermediate trailing link having a first end pivotably connected to the chassis and a second end pivotably connected to an intermediate walking beam at a waling beam pivot; the walking beams having a plurality of axle mounted bogey wheels for engaging a track of the tracked utility vehicle.

In another aspect of the invention, at least one of the trailing links further comprises a lock-out. In another aspect of the invention, the lock-out is a pneumatic lock-out comprised of the shock. In another aspect of the invention, the lock-out is a mechanical lock-out comprised of a mechanical lock-out member. In another aspect of the invention, the lock-out member further comprises a first end pivotably connected to the chassis and a second end selectively connected to the trailing link.

In another aspect of the invention, at least one of the walking beam members has a pan-hard rod comprised of a rigid rod having a first end and a second end; the first end is pivotably connected to the walking beam member and the second end is pivotably connected to the chassis opposite the walking beam.

In another aspect of the invention, the walking beam pivot of at least one walking beam is biased toward a front or a rear of the tracked utility vehicle. In another aspect of the invention, the walking beam pivot of the front walking beam is biased toward the front of the tracked utility vehicle, and the walking beam pivot of the rear walking beam is biased toward the rear of the tracked utility vehicle. In another aspect of the invention, the walking beam pivot of the front walking beam is biased toward the front of the tracked utility vehicle, and the walking beam pivot of the rear walking beam is biased toward the front of the tracked utility vehicle. In another aspect of the invention, the walking beam pivot of the front walking beam is biased toward the rear of the tracked utility vehicle, and the walking beam pivot of the rear walking beam is biased toward the rear of the tracked utility vehicle.

In another aspect of the invention, at least of the walking beams has a roll pivot, thereby permitting all of the bogey wheels of the walking beam to maintain contact with the track on uneven terrain. In another aspect of the invention, the roll pivot is located below the walking beam pivot and the axles of the walking beam.

In another aspect of the invention, the walking beam is further comprised of a forward section, a middle section, and a rear section; the forward section and the middle section are pivotably connected with a first roll pivot; the rear section and the middle section are pivotably connected with a second roll pivot; the walking beam pivot is situated in the middle section; the forward section and the rear section each have bogey wheels mounted on axles that engage at least one of the track, or a track lug or guide. In another aspect of the invention, the forward section and the rear section pivot independently. In another aspect of the invention, the first and second roll pivot movement is limited to about +/−10 degrees.

In another aspect of the invention, the trailing link is comprised of at least one swing arm.

In another aspect of the invention, the trailing link is comprised of a first swing arm and a second swing arm connected with an upper cross brace and a lower cross brace.

In another aspect of the invention, the shocks are comprised of at least one of coil, leaf or torsion springs; wherein the shocks are mechanical, hydraulic, and/or pneumatic.

In another aspect of the invention, the shocks are independently adjustable so that more of the tracked utility vehicle's weight is supported as a midpoint of the suspension.

In yet another aspect of the invention, a trailing link suspension for a tracked utility vehicle having a chassis is comprised of at least two trailing links, each of the trailing links having a shock and a walking beam; a first end of the trailing link is pivotably connected to the chassis and a second end of the trailing link is pivotably connected to the walking beam; the shock has a first end pivotably connected to the chassis and a second end pivotably connected to the trailing link; the walking beams having a plurality of axle mounted bogey wheels for engaging one or both of a track of the tracked utility vehicle or a track lug or guide of the track; wherein the shocks are independently adjustable to permit more of the tracked utility vehicle's weight to be supported at a midpoint of the suspension.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 2:
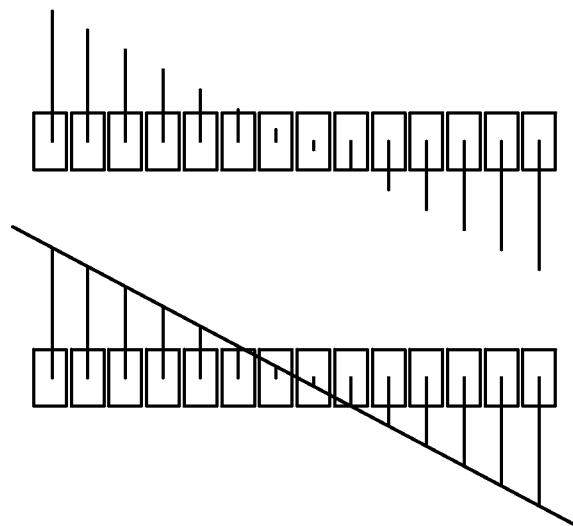
FIG. 2 is a force-magnitude diagram for a tracked utility vehicle executing a neutral axis (Zero) turn.
Figure 1:
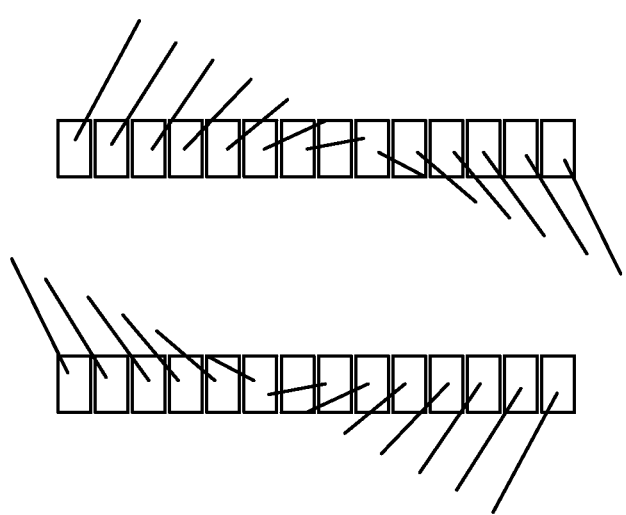
FIG. 1 is a force-direction diagram for a tracked utility vehicle executing a neutral axis (Zero) turn.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Figure 3:
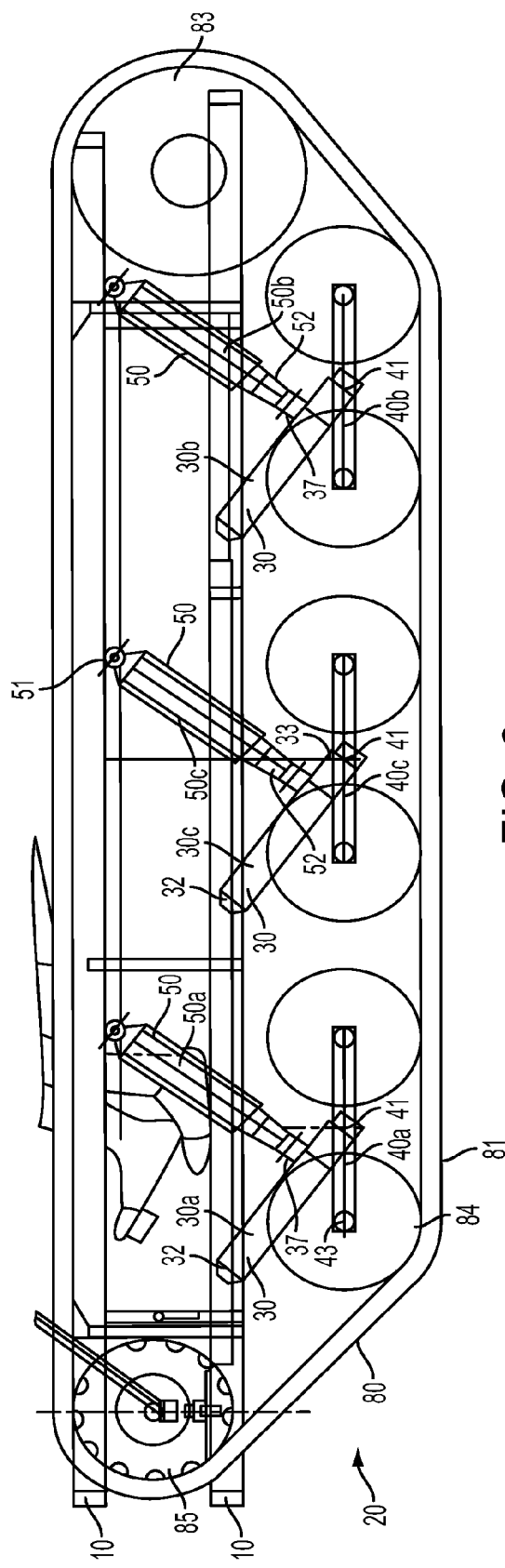
FIG. 3 is an exemplary embodiment of a suspension system for a tracked vehicle.
Figure 5:
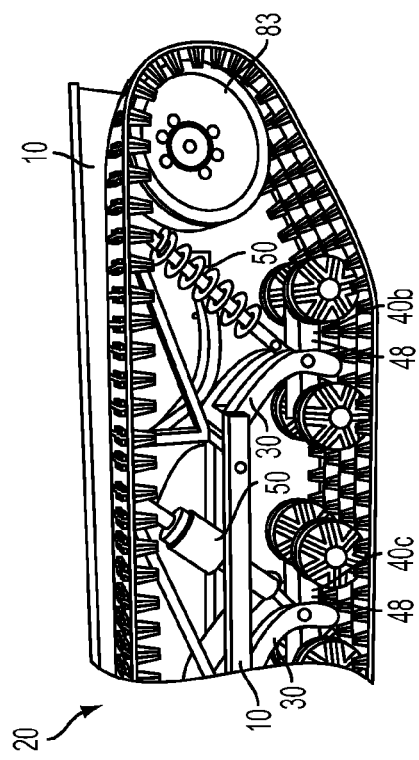
FIGS. 4-5 is an exemplary embodiment of a tracked utility vehicle suspension system with a walking beam pivot biased forward.
Figure 4:
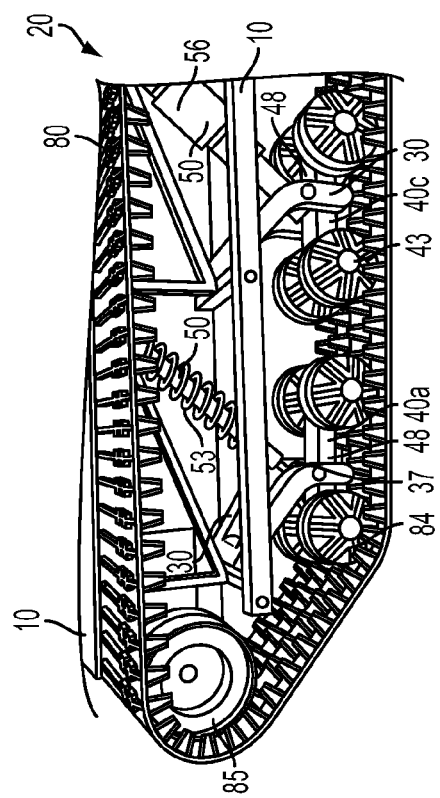

Turning to FIGS. 3-5, The Tracked Utility Vehicle's (TUV) weight is transferred from chassis 10 to the bottom length 81 of the tracks 80 (that portion contacting the terrain) by trailing link 30 and walking-beam 40 suspension elements incorporating sets of wheels called bogies 84. Six (6) trailing link 30 and walking-beam 40 elements are used for the suspension to transfer the TUV suspended weight through forty-eight (48) bogie wheels 84 onto the tracks 80 while cushioning the ride over uneven and rough terrain. FIG. 3, depicts side of TUV having one track 80. The other side of TUV has a second track that mirrors the track depicted in FIG. 3. In this embodiment, each track 80 of TUV has three (3) trailing link 30 and walking-beam 40 elements. Each walking beam element 40 has eight (8) bogie wheels.

Configurations are anticipated that incorporate more or less trailing links, walking beams, and bogie wheels, but in this example TUV suspension 20, six (6) trailing links, six (6) walking beams, and forty-eight (48) bogie wheels are depicted.

Transfer of power to the tracks 80 in FIG. 3 is accomplished by drive sprockets 85, that are powered by transmissions or motors that engage lugs and guides 86 in the track 80. A non-powered wheel, a tensioning idler 83, is placed at the opposite end of the track 80 from drive sprocket 85, primarily to tension the track-loose track could be easily thrown (slipped) off the wheels. As is depicted in FIG. 3-5, the trailing-link suspension is a design in which trailing links 30 are connected between (and perpendicular to and forward of) the walking beam 40 and the chassis 10. The trailing-link design uses just one trailing link 30 and an adjustable shock 50 to locate the walking-beams longitudinally and laterally. Each trailing link 30 has a first end 32 pivotably connected to chassis 10 and a second end 33 pivotably connected to walking beam 40 at walking beam pivot 41. Further, each trailing link 30 also has a shock flange 37 close to second end 33. Trailing links can have a single swing arm design, such as depicted in FIG. 3, or a multiple swing arm design, such as is depicted in FIGS. 4 and 5.

Further, in FIGS. 3-5, each shock 50 has a first end 51 and a second end 52. The first end 51 is pivotably connected to chassis 10 at a chassis shock flange 15. The second end 52 is pivotably connected to trailing link 30 at trailing link shock flange 37. The suspension rate of the shocks 50 are used to set the vehicle's ride-height (its location in the suspension stroke). Shocks 50 can have coil, leaf, or torsion springs. Further, shocks 50 can be hydraulic and/or pneumatic spring devices. The TUV has adjustable pre-load springs 53 to allow for suspension compensation during periods when additional temporary or permanent payload weight is used (that could otherwise affect ride-height or collapse the suspension). The shock 50 is configured so as to maintain bogie wheel 84 contact with the track 80. It is anticipated that the preload of shock 50 can be non-adjustable, mechanically adjustable, or air adjustable. Further, it is anticipated that the spring rate and dampening of shock 50 can be fixed and dictated pneumatically, or can be adjustable via an air spring 56. Spring rate and dampening for air shocks can be made by changing the amount of air in air spring 56 via air spring valve 54. To an extent, the drag created during turning maneuvers can be minimized by concentrating the weight on the middle of the contact patch (where the sliding movement is smallest) by increasing the spring rates and preload of the mid-section spring elements. Track tension is established and maintained via the adjustable spring rates of the roller or separate track tensioning idler 83. Accordingly, suspension 20 includes mechanical (coil, leaf, torsion, etc.) springs 50 and hydraulic or pneumatic spring devices 50 that are individually selected or adjusted so that the mid-sections of suspension 20 can support more of the TUV weight to reduce the lateral forces generated during turning maneuvers. The mid sections include intermediate walking beam(s) 40c, and associated shock 50c and trailing link 30c.

The walking beam suspension 20 depicted in FIGS. 3-5 is particularly useful in off-road applications incorporating tracks, since it offers great lateral stability, ride comfort, and only tend to raise load height minimally when small changes in the terrain are encountered. Walking beams 40 are assemblies with a pivot point 41, about which there are portions of the "beam" on each side. In this embodiment, a trailing link 30 is pivotably connected to each walking beam 40 at the walking beam pivot point 41.

Each end of the walking beam 40 incorporates an axle 43 assembly containing four (4) bogie wheels 84 which provides eight (8) bogie wheels per walking beam 40. Pivoting (pitching) of the walking beams 40 allow for track segment movements with bounce (jounce) and rebound forces being centralized and equalized (or proportioned) at the walking beam/trailing link pivot 41 generally with minimal reaction of trailing link 30, even during large pitch movements of the walking beam 40. In some embodiments, walking beams 40 may incorporate torsion or jounce elastomeric blocks to absorb shock and control pivot rotation (pitch).

As can be seen, FIG. 3 depicts the left side suspension 20 and chassis 10 of TUV. As is described above, the left side suspension 20 has one shock 50 per trailing link 30, namely forward shock 50*a*, rear shock 50*b*, and one or more intermediate shock(s) 50*c* located between forward shock 50*a* and rear shock 50*b*. Further, the left suspension has one trailing link 30 per walking beam 40, namely forward walking beam 40*a*, rear walking beam 40*b*, and one or more intermediate walking beam(s) 40*c* located between forward walking beam 40*a* and rear walking beam 40*b*. For the sake of brevity, it is understood that the right side suspension 20 and chassis 10 of TUV is a mirror image of the left side suspension 20 and chassis 10 described herein.

Figure 6:
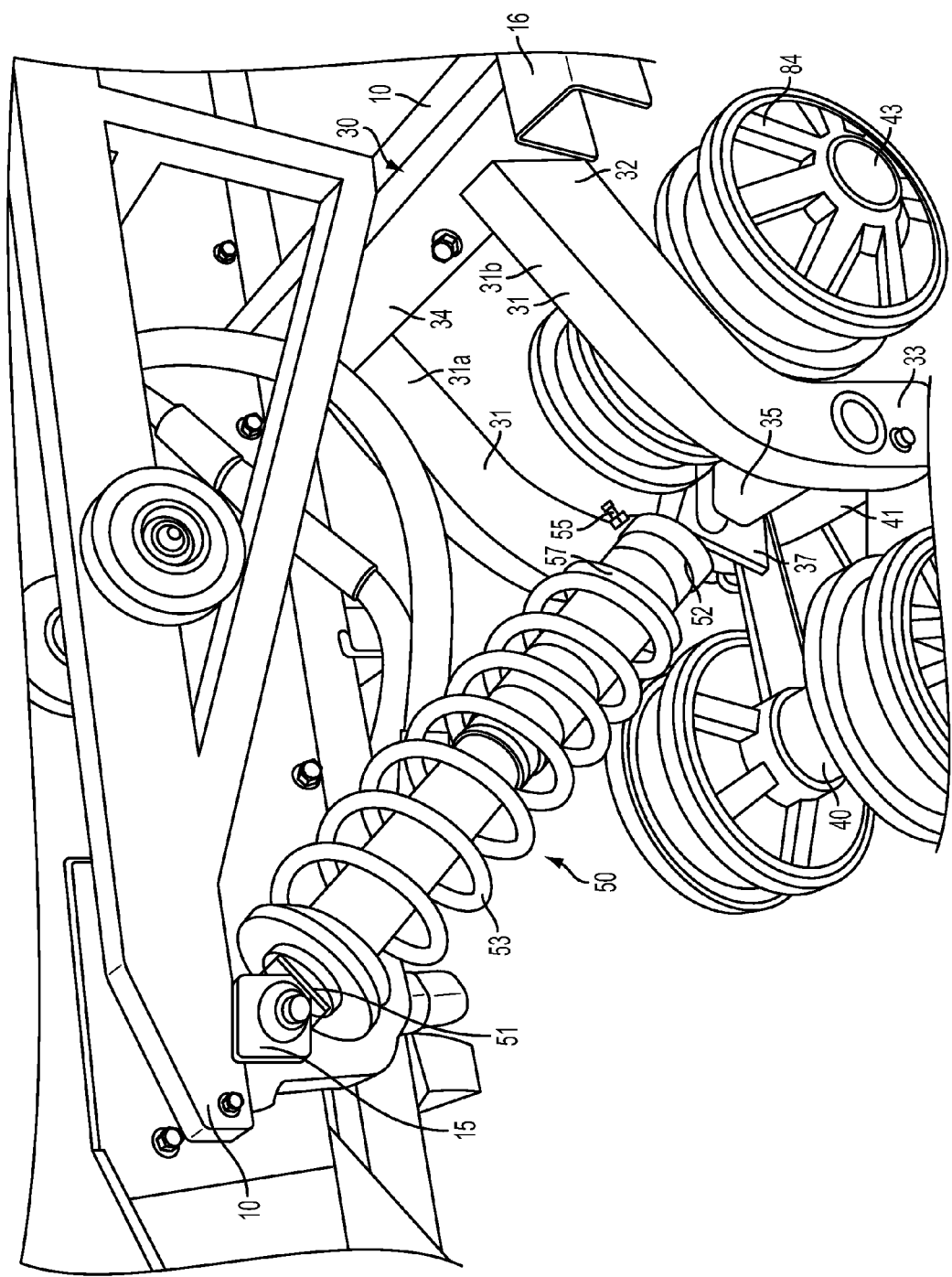
FIG. 6 depicts an exemplary embodiment of a trailing arm, walking beam, shock, and bogey wheels of a tracked vehicle suspension system.

FIG. 6 is a close up depiction of a shock 50, trailing link 30, and walking beam 40. Shock 50 has a first end 51 and a second end 52. The first end 51 is pivotably connected to chassis 10 at a chassis shock flange 15. The second end 52 is pivotably connected to trailing link 30 at trailing link shock flange 37. Preload of shock 50 is dictated by the load placed upon spring 53 by mechanical and air means. For hydraulic shocks, rough preload can be adjusted via pneumatic pressure through preload air valve 55 and an air pump, and finer preload adjustments can be made mechanically by adjusting the position of collar 57. For mechanical shocks, preload adjustments can be made mechanically by adjusting the position of collar 57. For air shocks, preload can be adjusted via pneumatic pressure through preload air valve 55 and an air pump.

Figure 7:
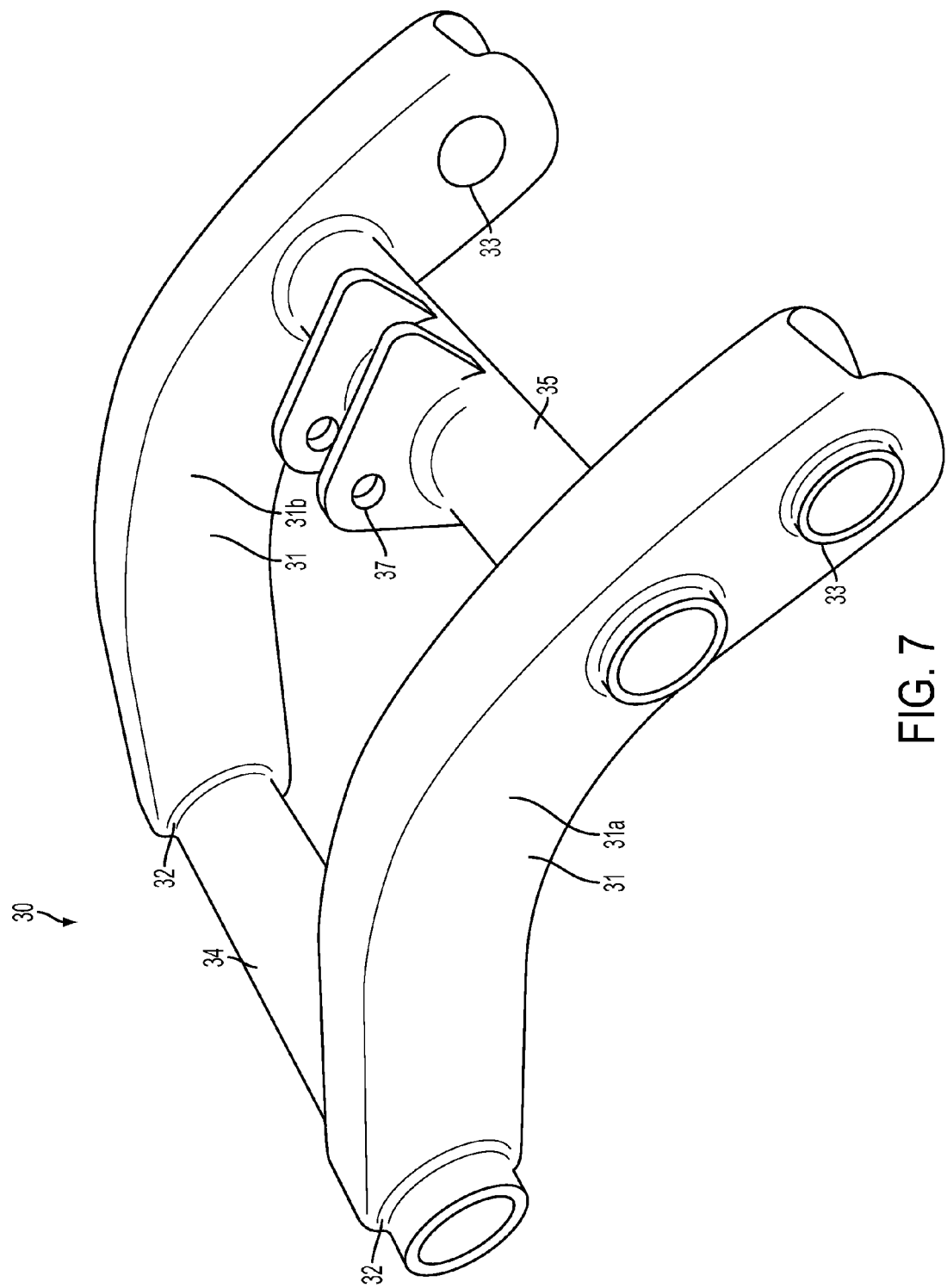
FIG. 7 depicts an exemplary embodiment of a trailing arm of a tracked vehicle suspension system.

Further, FIG. 6 depicts trailing link 30 having multiple curved swing arms 31. In this embodiment, trailing link 30 has a first swing arm 31*a* and a second swing arm 31*b* connected together via an upper cross brace 34 and a lower cross brace 35. The first end 32 of trailing link 30 is pivotably connected to chassis 10 at a chassis trailing link flange 16. The second end 33 of trailing link 30 is pivotably connected to walking beam 40 at walking beam pivot 41. Lower cross brace 35 has a shock flange 37 for connecting the second end 52 of shock 50 to trailing link 30. Walking beam 40 is pivotably connected to trailing link 30 at walking beam pivot 41. In the embodiment shown, walking beam has two axles 43, with each axle 43 having four bogey wheels 84. FIG. 7 is a close-up depiction of trailing link 30 described above in conjunction with FIG. 6.

Turning back to FIGS. 3-6, biasing the walking beam pivot 41 of walking beam 40 toward one end or the other of walking beam 40 results in the suspension reaction that the walking beam 40 transfers to the trailing link 30 proportionally increasing in direct relationship to the decrease in distance between the bogie wheel axle 43 to the walking beam pivot 41; this effectively provides different suspension rates in different track segments. In FIG. 3, the walking beam pivot 41 of the walking beams 40 are not biased. In FIGS. 4-5, the walking beam pivot 41 of the most forward walking beam 40*a* and rear walking beam 40*b* are both biased toward the front of the TUV, and intermediate walking beam 40*c* is neutral, which shifts the contact patch towards the front of TUV. In another embodiment, it is contemplated that the walking beam pivot 41 of the most forward walking beam 40*a* and rear walking beam 40*b* are both biased toward their respective ends, and this maximizes the effective bottom length of track (increases floatation and reduces ground pressure).

Figure 8:
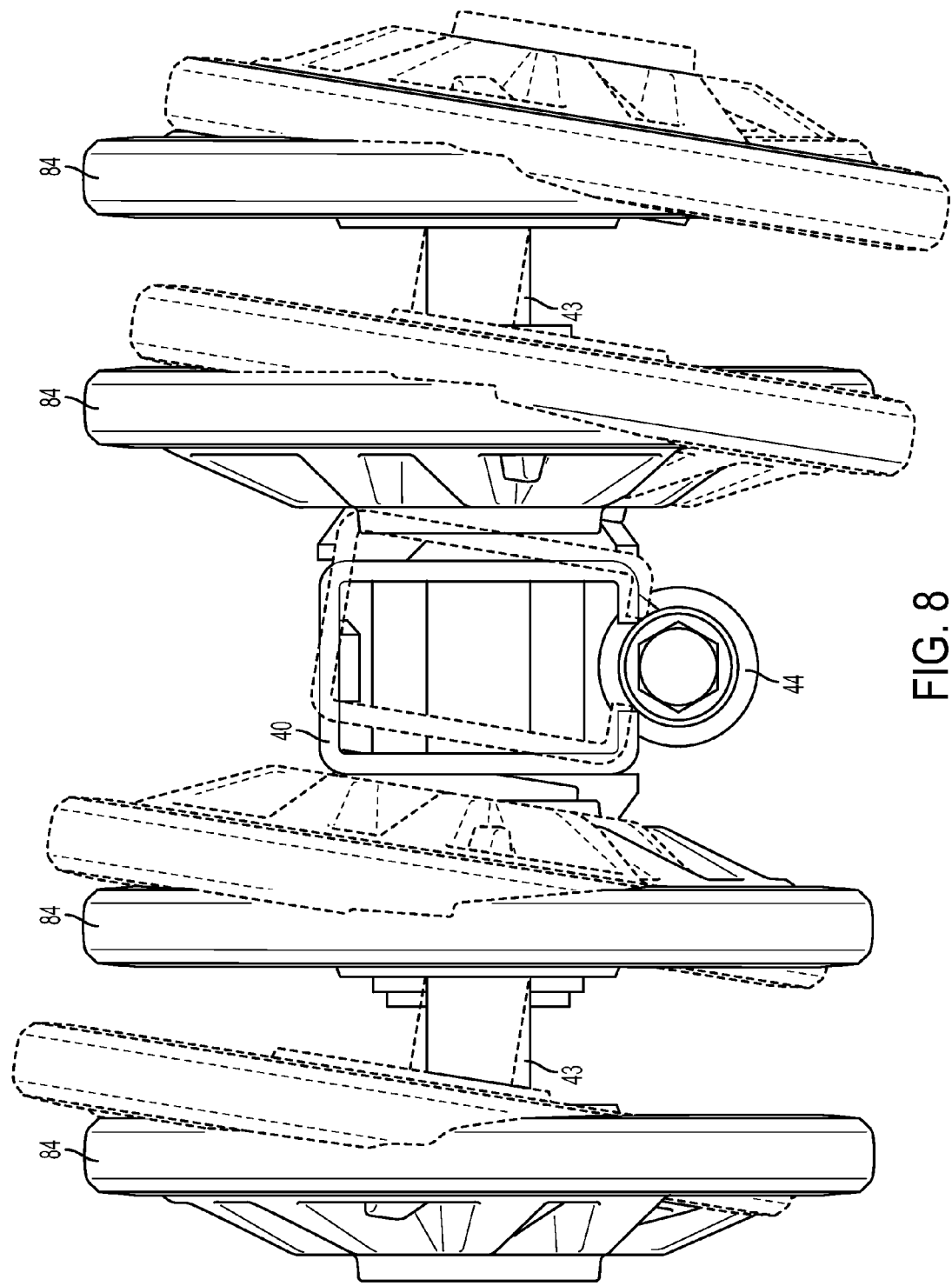
FIG. 8 depicts an exemplary embodiment of a walking beam incorporating an additional degree of freedom (roll)
Figure 10:
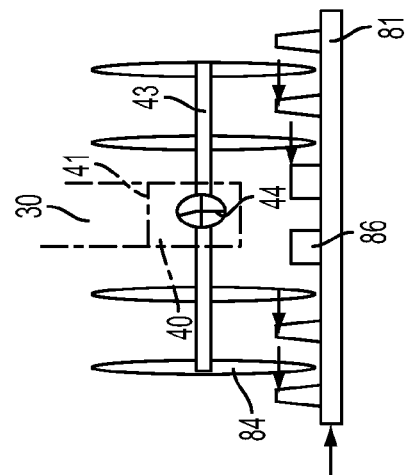
FIG. 10 depicts an exemplary embodiment of bogey wheels mounted to a roll-pivot equipped walking beam during a turn on flat terrain.
Figure 9:
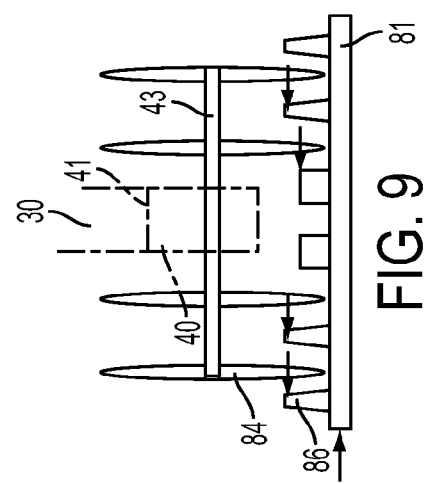
FIG. 9 depicts a bogey wheels mounted to a non roll-pivot equipped walking beam during a turn on flat terrain.

Turing to FIG. 8, some embodiments of walking beam 40 incorporate an additional degree of freedom (roll) so that walking beam 40 maintains the pitch function and restricts the yaw movements. By adding the roll function provided by roll-pivot 44, bogie wheels 84 on axles 43 maintain contact with the tracks 80 and track lugs and guides 86 during instances whereby one or both tracks 80 engage a laterally positioned slope that is substantially greater than that of the TUV. This is demonstrated in FIGS. 9-12. More specifically, FIG. 9 depicts bogey wheels 84 mounted to a non-roll-pivot equipped walking beam 40 during a turn on flat terrain. As can be seen, all four of the bogey wheels 84 depicted are able to engage track 80 or track lugs and guides 86 during the turn on flat terrain. FIG. 10 depicts bogey wheels 84 mounted to a roll-pivot 44 equipped walking beam 40 during a turn on flat terrain. As can be seen, all four of the bogey wheels 84 depicted are able to engage track 80 or track lugs and guides 86 during the turn on flat terrain.

Figure 12:
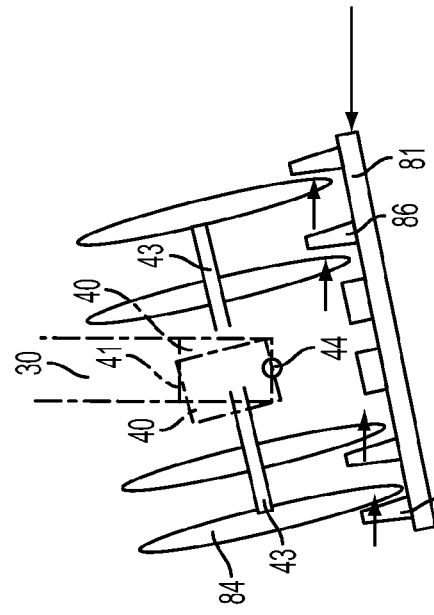
FIG. 12 depicts an exemplary embodiment of bogey wheels mounted to a roll-pivot equipped walking beam during a turn on sloped terrain.
Figure 11:
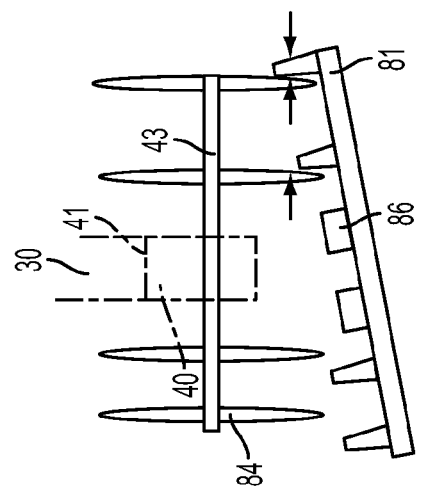
FIG. 11 depicts bogey wheels mounted to a non-roll-pivot equipped walking beam during a turn on sloped terrain.

FIG. 11 depicts bogey wheels 84 mounted to a non-roll-pivot equipped walking beam 40 during a turn on sloped terrain. As can be seen, only two of the four bogey wheels 84 depicted are able to engage track 80 or track lugs and guides 86 during the turn on sloped terrain. FIG. 12 depicts bogey wheels mounted to a roll-pivot equipped walking beam during a turn on sloped terrain. As can be seen, all four of the bogey wheels 84 depicted are able to engage track 80 or track lugs and guides 86 during the turn on sloped terrain.

Figure 13:
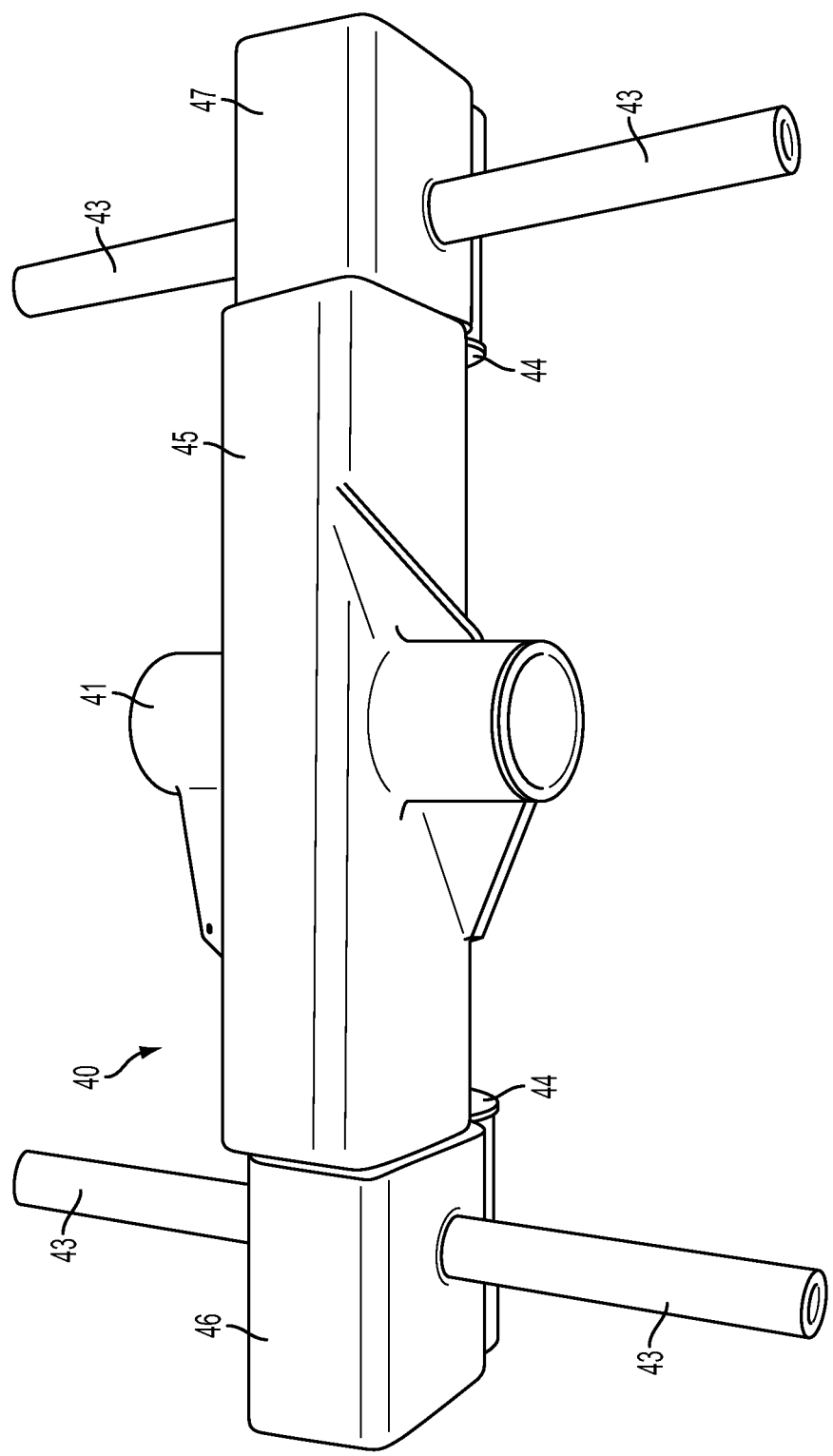
FIGS. 13-15 are exemplary embodiments of a roll-pivot equipped walking beam.
Figure 14:
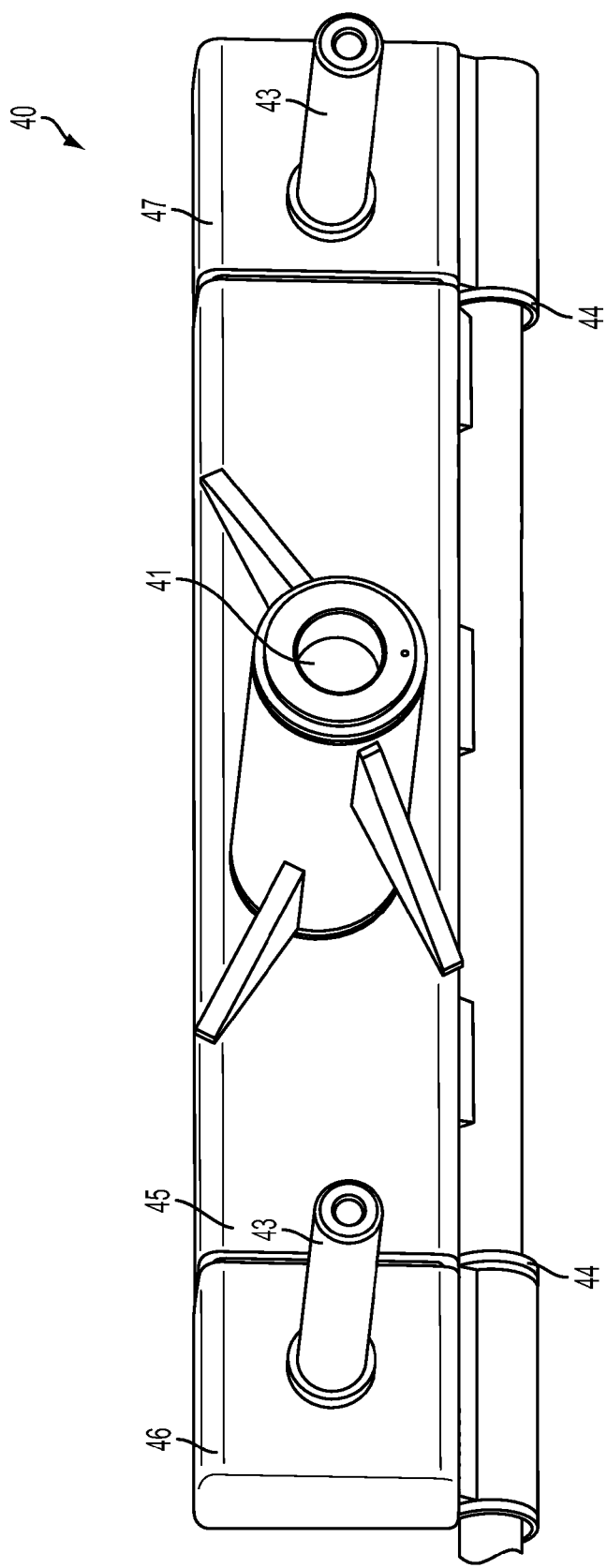
Figure 15:
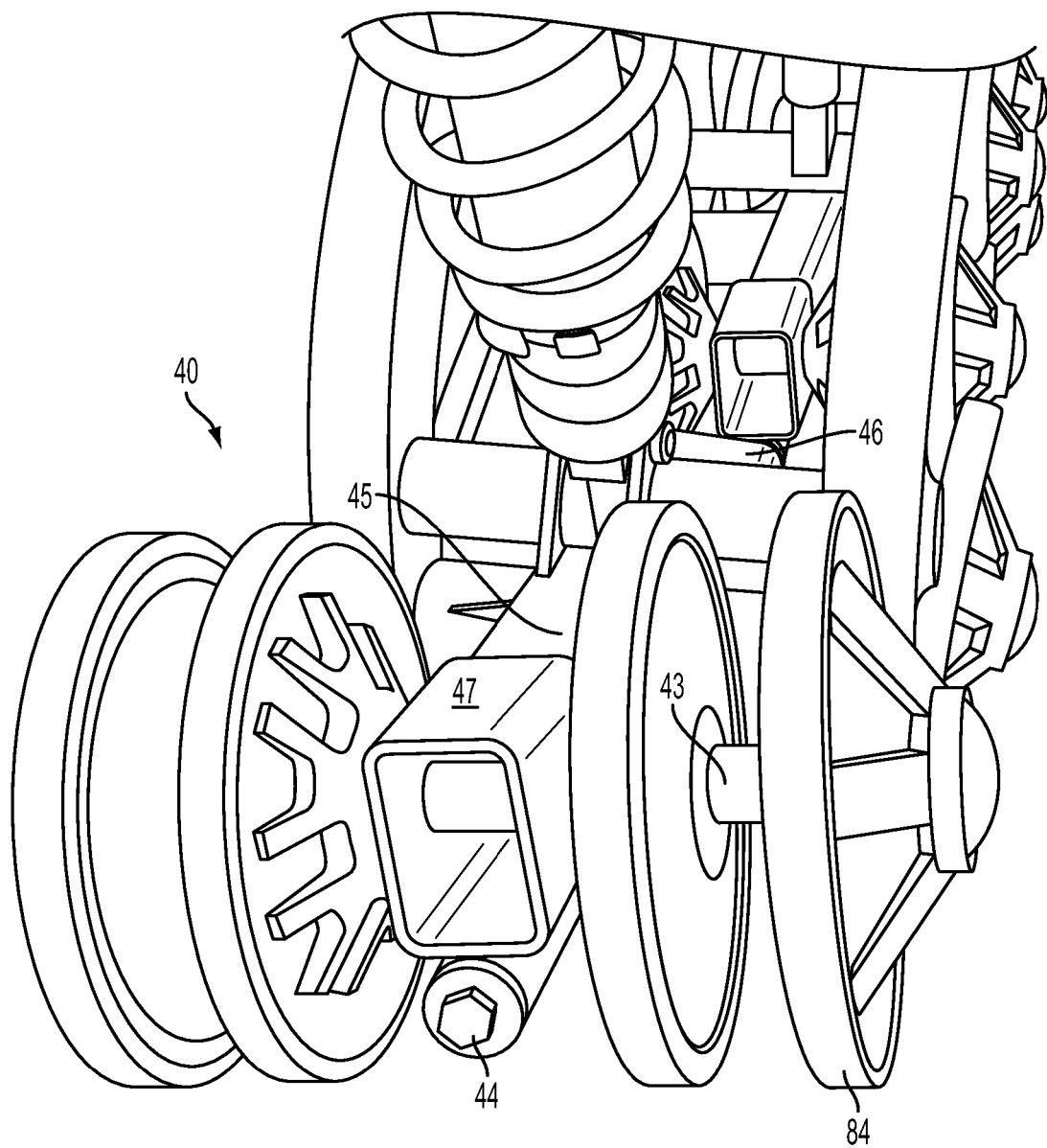

From the attached figures, it is apparent that on some slopes, only two (2) or possibly four (4) of eight (8) bogie wheels of walking beam 40 could be engaging the track 80 or lugs and guides 86 on the tracks 80, which could cause the lugs and guides 86 to deform and allow the bogie wheels 84 to slide over the lugs and guides 86 creating a derailment of track 80. This condition of track derailment is prevented by including roll-pivot 44 in walking beams 40, such as that depicted in FIG. 13, which would permit all the bogie wheels 84 on axles 43 to remain in contact with the track 80 and/or lugs and guides 86 so as to share the loading and minimize deformation of guide lug 86.

Turning to FIGS. 8 and 13-15, it can be seen that in some embodiments, the axis for roll pivot 44 is placed below the walking beam pivot 41 axis and bogie wheel axles 43 in order to enhance stability. Further, in some embodiments, stability is further increased by having a roll pivot 44 between forward section 46 and middle section 45 of walking beam 40, and having another roll pivot 44 between rear section 47 and middle section 45 of walking beam 40. This allows forward section 46 and rear section 47 to independently pivot at different angles from each other, which increases stability on terrain having quickly changing angles.

In additional embodiments, the roll pivot 44 movement is limited to about +/−10 degrees.

Figure 16:
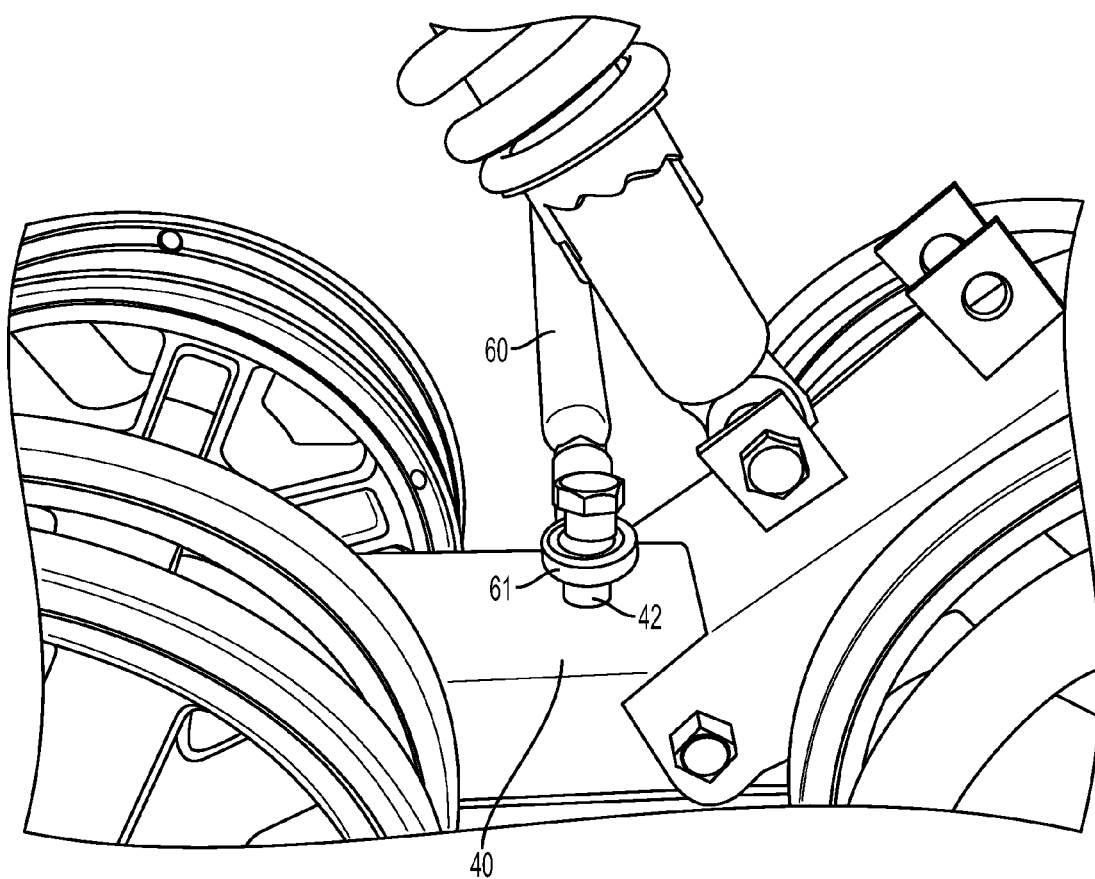
FIGS. 16-17 is an exemplary embodiment of a walking beam having a pan-hard rod.
Figure 17:
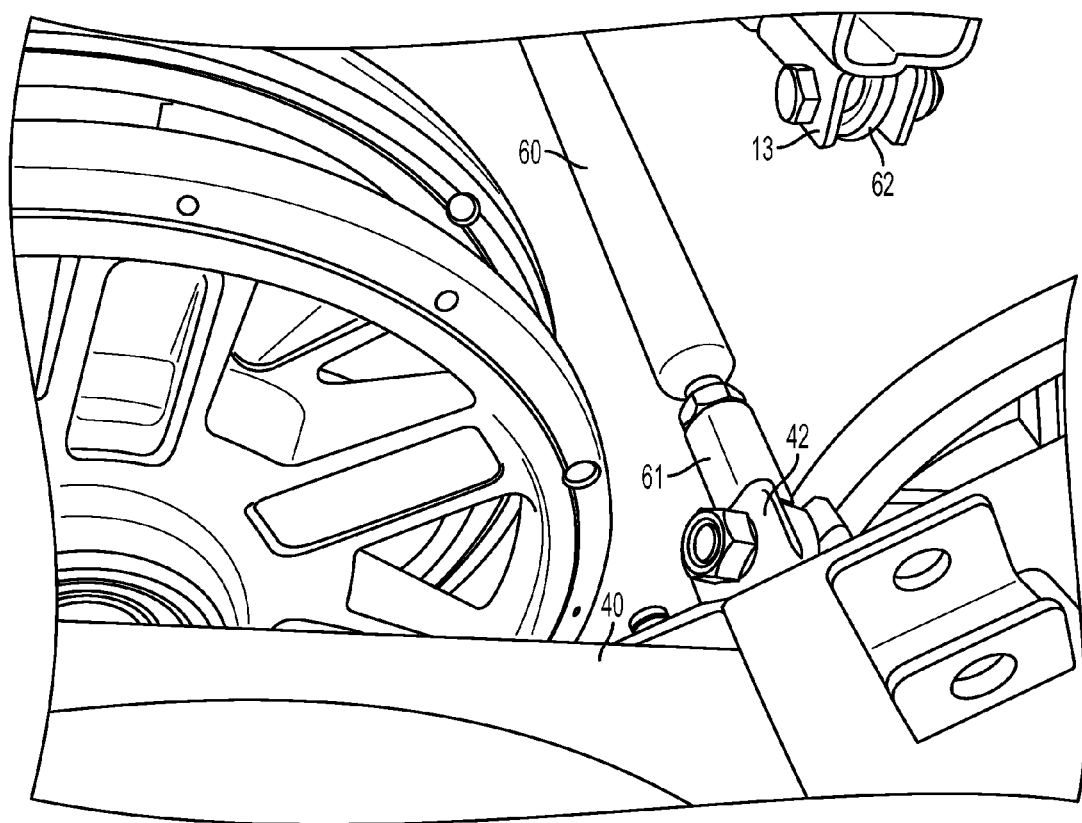

Turning to FIGS. 16-17, pan-hard rods 60 can be used to stabilize the trailing links 30 and to prevent lateral movement of the walking beams 40, but the trailing links 30 can also be designed to minimize lateral deflections, such as by employing multiple swing arms on a trailing link 30. Each pan-hard rod 60 has a rigid rod 63 oriented in the same general orientation as the bogie axles 43 (perpendicular to walking beam 40). Pan-hard rod 60 has a pivot on a first end 61 and a pivot on a second end 62. Pivots on first end 61 and second end 62 can be spherical rod ends or similar devices which connect to walking beam 40 and chassis 10 on the opposite side of TUV from walking beam 40.

Looking at FIGS. 16 and 17, it can be seen that first end 61 of pan-hard rod 60 is connected to pan-hard rod flange 42 of walking beam 40. Further, FIG. 17 depicts two pan-hard rods 60, and demonstrates how first end 61 of pan-hard rod 60 connects to walking beam 40 on one side of TUV, and second end 62 of pan-hard rod 60 connects to pan-hard rod flange 13 of chassis 10 on the opposite side of TUV from walking beam 40. The Pan-hard rods permit movement upwards and downwards only in the vertical plane. There are tremendous de-tracking forces developed on the bogie wheels/walking-beams during TUV turning maneuvers. Yaw reactions of the walking beams 40 are resisted by the trailing links 30 (and the pan-hard rods 60 if used due to the attachment location of the rods 60 to the walking beams 40).

Figure 18:
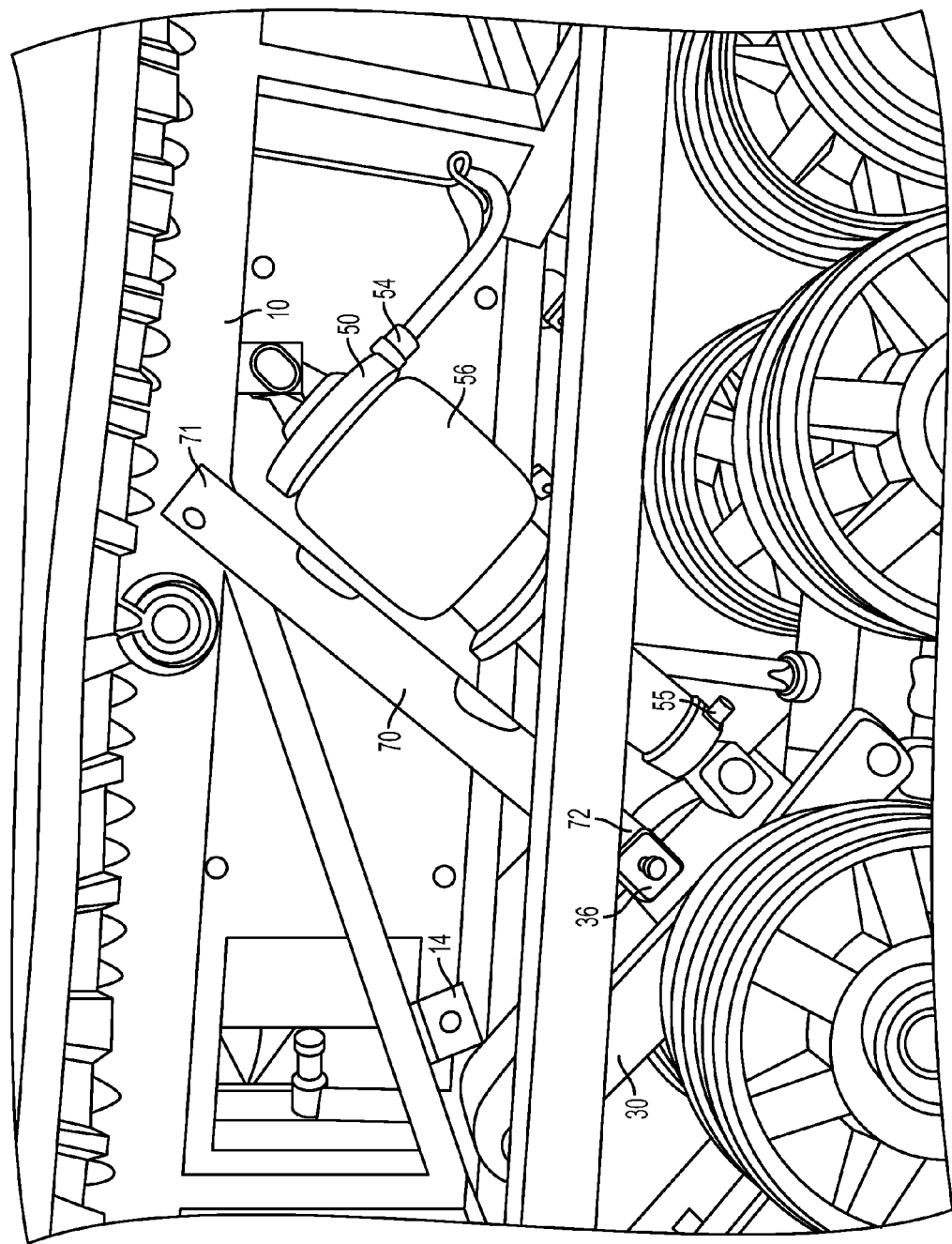
FIGS. 18-19 are exemplary embodiments of a trailing link having a mechanical lock-out or pneumatic lock-out.
Figure 19:
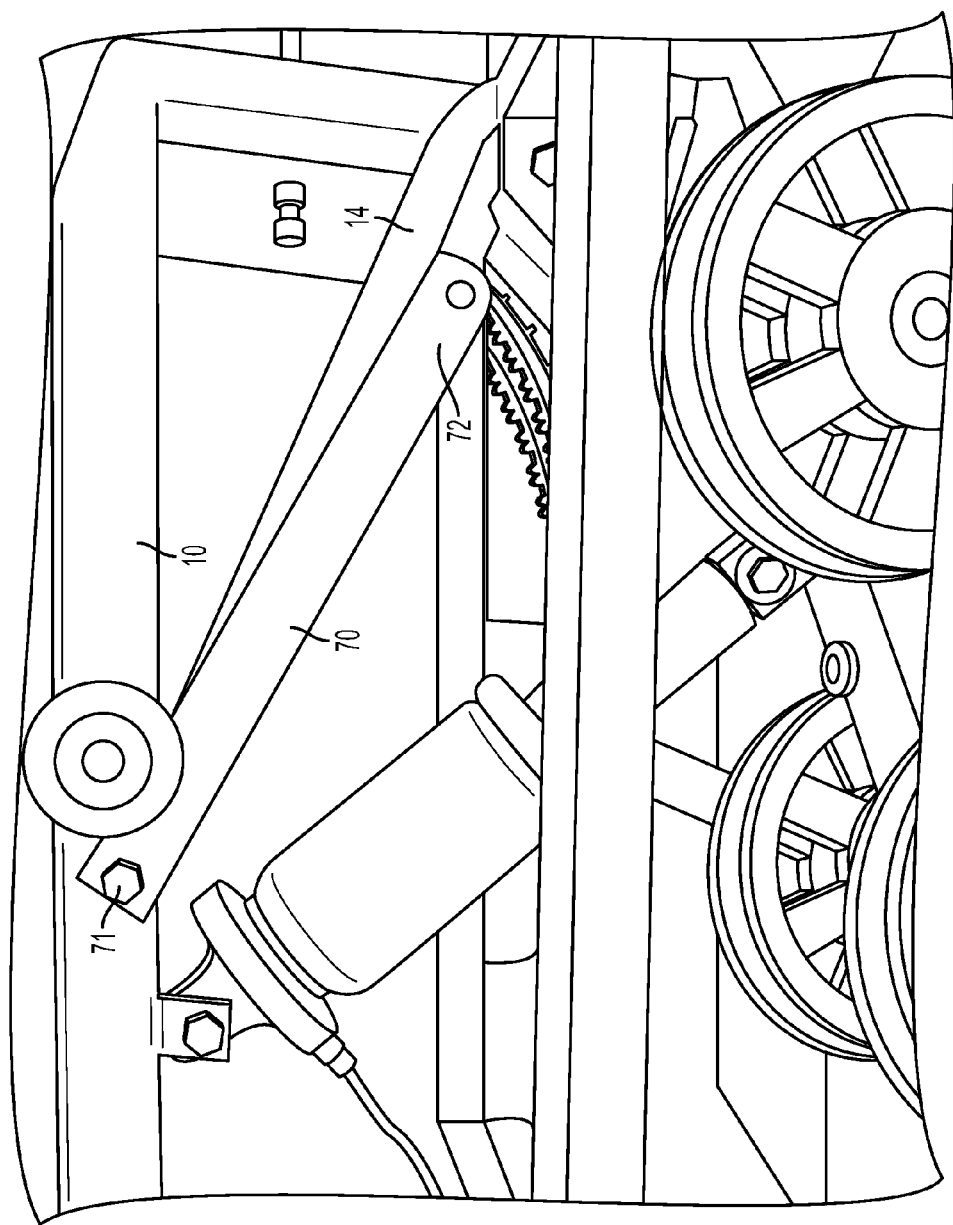

As depicted in FIGS. 18-19, some embodiments of suspension 20 also include a trailing link lock-out, such as a pneumatic trailing link lock-out, using pneumatic shock 50, or mechanical trailing link lock-out, using mechanical lock-out member 70, to reduce or minimize suspension reactions, such as reducing TUV duck-bobbing (front suspension of TUV oscillating up and down) when the front of TUV is equipped with a heavy implement that extends beyond the footprint of tracks 80.

A mechanical trailing link lock-out is achieved using a mechanical lock-out member 70 having a first end 71, which is pivotably attached to chassis 10, and a second end 72. Second end 72 selectively attaches to mechanical lock-out storage flange 14 of chassis 10 or selectively attaches to mechanical lock-out flange 36 of trailing link 30. Accordingly, when mechanical lock-out member 70 is engaged, second end 72 is attached to mechanical lock-out flange 36 of trailing link 30, thereby reducing or minimizing suspension reactions by holding trailing link 30 stationary. However, when mechanical lock-out member 70 is not engaged, second end 72 is attached to mechanical lock-out storage flange 14 of chassis, thereby not limiting the travel of trailing link 30.

The pneumatic trailing link lock-out is achieved by varying the spring rates of pneumatic and/or hydraulic springs of shock 50 such that the spring rates were set high enough that shock 50 functioned in a manner similar to a mechanical lockout member 70 (forward mechanical lockout member 70a, rear mechanical lockout member 70b, or intermediate mechanical lockout member(s) 70c). It is anticipated that in some embodiments, one or more of forward trailing arm 37a, rear trailing arm 37b, or intermediate trailing arm(s) 37c can be mechanically locked-out pneumatically via shock 50 (forward shock 50a, rear shock 50b, or intermediate shock(s) 50c) or a mechanical lockout member 70 (forward mechanical lockout member 70a, rear mechanical lockout member 70b, or intermediate mechanical lockout member(s) 70c).

The system includes a Utility Vehicle with a chassis 10, an Occupant Protection System, bench or bucket seating, a Spark or Compression Ignition engine, hydrostatic (pumps and motors) traction-drive system, service and park brake systems, a steering system that controls the speed and direction of the tracks based on steer-angle input, a speed/directional control linkage, a suspension system and ground engaging tracks. The system can also include stored-energy devices, electric generator/alternators, and electric motors. The system can also include tracks 80 to support and transfer the loading of the machine through suspension elements to the terrain it traverses. The system can also include suspension elements including mechanical (coil, leaf, torsion, etc.) springs 50 and hydraulic or pneumatic spring devices 50. The system can also include suspension elements including mechanical (coil, leaf, torsion, etc.) springs 50 and hydraulic or pneumatic spring devices 50 that are individually selected or adjusted so that the mid-sections can support more of the machine weight to reduce the lateral forces generated during turning maneuvers. The system can also include manually or power adjustable suspension elements. The system can also include trailing-links 30 to transfer vertical and lateral loading (mass and payload) of the machine chassis 10 to the walking-beams 40. The system can also include walking-beams 40 with the walking beam pivots 41 biased toward one end or the other, and centered for the mid sections, that transfer the vertical and lateral loading of the machine from the trailing-links 30 to the bogie wheels 84.

The system can also include walking beams 40 that limit yaw movements, but allow pitch and roll movements that maintain bogie wheel 84 contact with the tracks 80. The system can also include bogie-wheels 84 that transfer the vertical and lateral load reactions of the machine that occur during normal operations, turning maneuvers and side hill operations, from the walking-beams 40 to the tracks 80. The system can also include tracks 80 with drive and guide lugs 86 that transfer the vertical, lateral and longitudinal loading of the machine from the bogie-wheels 84 and drive sprockets 85 to the terrain, and this includes the lateral reactions that occur during turning maneuvers and the traction forces generated by the drive sprockets 85. The system can also include return rollers to keep the top of the track running straight between the drive sprocket 85 and idler 83. The system can also include Pan-Hard rods 60 to control and transfer lateral force reactions, generated during side hill operation and turning maneuvers, from the TUV chassis to the trailing links 30 and walking beams 40. The system can also include an adjustable spring-loaded system that maintains track tension. The system can also include increased ground contact area (fore-and-aft) with lower ground pressure. The system can also include a low propensity for track derailment and operation at high travel speeds. The system can also include improved ride quality compared to other suspension systems.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein.

What is claimed is:

1. A trailing link suspension for a tracked utility vehicle having a chassis comprising:
   a forward trailing link having a first end pivotably connected to said chassis and a second end pivotably connected to a forward walking beam at a walking beam pivot; a forward shock having a first end pivotably connected to said chassis and a second end pivotably connected to said forward trailing link;
   a rear trailing link having a first end pivotably connected to said chassis and a second end pivotably connected to a rear walking beam at a walking beam pivot; a rear shock having a first end pivotably connected to said chassis and a second end pivotably connected to said rear trailing link;

an intermediate trailing link located between said forward trailing link and said rear trailing link; said intermediate trailing link having a first end directly and pivotably connected to said chassis and a second end directly and pivotably connected to an intermediate walking beam at a walking beam pivot;

said walking beams having a plurality of axle mounted bogey wheels for engaging a track of said tracked utility vehicle.

2. The trailing link suspension of claim 1, wherein at least one of said trailing links further comprises a lock-out.

3. The trailing link suspension of claim 2, wherein said lock-out is a pneumatic lock-out comprised of said shock.

4. The trailing link suspension of claim 2, wherein said lock-out is a mechanical lock-out comprised of a mechanical lock-out member.

5. Said mechanical lock-out member of claim 4 further comprising a first end pivotably connected to said chassis and a second end selectively connected to said trailing link.

6. The trailing link suspension of claim 1, wherein at least one of said walking beams has a pan-hard rod comprised of a rigid rod having a first end and a second end; said first end is pivotably connected to said walking beam and said second end is pivotably connected to said chassis opposite said walking beam.

7. The trailing link suspension of claim 1, wherein said walking beam pivot of at least one walking beam is biased toward a front or a rear of said tracked utility vehicle.

8. The trailing link suspension of claim 7, wherein said walking beam pivot of said front walking beam is biased toward the front of said tracked utility vehicle, and said walking beam pivot of said rear walking beam is biased toward the rear of said tracked utility vehicle.

9. The trailing link suspension of claim 7, wherein said walking beam pivot of said front walking beam is biased toward the front of said tracked utility vehicle, and said walking beam pivot of said rear walking beam is biased toward the front of said tracked utility vehicle.

10. The trailing link suspension of claim 7, wherein said walking beam pivot of said front walking beam is biased toward the rear of said tracked utility vehicle, and said walking beam pivot of said rear walking beam is biased toward the rear of said tracked utility vehicle.

11. The trailing link suspension of claim 1, wherein at least one of said walking beams has a roll pivot, thereby permitting all of said bogey wheels of said walking beam to maintain contact with said track on uneven terrain.

12. The trailing link suspension of claim 11, wherein said roll pivot is located below said walking beam pivot and said axles of said walking beam.

13. The trailing link suspension of claim 1, wherein at least one of said walking beams is further comprised of a forward section, a middle section, and a rear section; said forward section and said middle section are pivotably connected with a first roll pivot; said rear section and said middle section are pivotably connected with a second roll pivot; said walking beam pivot is situated in said middle section; said forward section and said rear section each have bogey wheels mounted on axles that engage at least one of said track, or a track lug or guide.

14. The walking beam of claim 13, wherein said forward section and said rear section pivot independently.

15. The walking beam of claim 13, wherein said first and second roll pivot movement is limited to about +/−10 degrees.

16. The trailing link suspension of claim 1, wherein said trailing link is comprised of at least one swing arm.

17. The trailing link suspension of claim 1, wherein said trailing link is comprised of a first swing arm and a second swing arm connected with an upper cross brace and a lower cross brace.

18. The trailing link suspension of claim 1, wherein said shocks are comprised of at least one of coil, leaf or torsion springs; wherein said shocks are mechanical, hydraulic, and/or pneumatic.

19. The trailing link suspension of claim 1, wherein said shocks are independently adjustable so that more of the tracked utility vehicle's weight is supported as a midpoint of said suspension.

20. A trailing link suspension for a tracked utility vehicle having a chassis comprising:
    at least two trailing links, each of said trailing links having a shock and a walking beam; a first end of said trailing link is pivotably connected to said chassis and a second end of said trailing link is pivotably connected to said walking beam; said shock has a first end directly and pivotably connected to said chassis and a second end directly and pivotably connected to said trailing link;
    said walking beams having a plurality of axle mounted bogey wheels for engaging one or both of a track of said tracked utility vehicle or a track lug or guide of said track;
    wherein said shocks are independently adjustable to permit more of the tracked utility vehicle's weight to be supported at a midpoint of said suspension.

21. A trailing link suspension for a tracked utility vehicle having a chassis comprising:
    at least two trailing links, said at least two trailing links having a forward trailing link and a rear trailing link; said forward and rear trailing links each having a shock and a walking beam;
    a first end of said forward trailing link is pivotably connected to said chassis and a second end of said forward trailing link is pivotably connected to said forward walking beam; said forward shock has a first end directly and pivotably connected to said chassis and a second end directly and pivotably connected to said forward trailing link; and
    a first end of said rear trailing link is pivotably connected to said chassis and a second end of said rear trailing link is pivotably connected to said rear walking beam; said rear shock has a first end directly and pivotably connected to said chassis and a second end directly and pivotably connected to said rear trailing link.

* * * * *